ELECTROSTATIC PRINTING SYSTEM WITH CONTROLLED POWDER FEED

Filed July 14, 1964

4 Sheets-Sheet 1

CLYDE O. CHILDRESS
RICHARD W. MELMON
INVENTORS

BY Samuel Lindenberg

ATTORNEY

ELECTROSTATIC PRINTING SYSTEM WITH CONTROLLED POWDER FEED

Filed July 14, 1964

CLYDE O. CHILDRESS
RICHARD W. MELMON
INVENTORS

BY Samuel Lindenberg

ATTORNEY

Nov. 15, 1966 C. O. CHILDRESS ET AL 3,285,167

ELECTROSTATIC PRINTING SYSTEM WITH CONTROLLED POWDER FEED

Filed July 14, 1964 4 Sheets-Sheet 3

INVENTORS
CLYDE CHILDRESS
RICHARD W. MELMON
BY Samuel Lindenberg
ATTORNEY

ELECTROSTATIC PRINTING SYSTEM WITH CONTROLLED POWDER FEED

Filed July 14, 1964

INVENTORS
CLYDE CHILDRESS
RICHARD W. MELMON
BY Samuel Lindenberg
ATTORNEY

United States Patent Office 3,285,167
Patented Nov. 15, 1966

3,285,167
ELECTROSTATIC PRINTING SYSTEM WITH CONTROLLED POWDER FEED

Clyde O. Childress, Palo Alto, and Richard W. Melmon, San Francisco, Calif., assignors, by mesne assignments, to Crocker-Citizens National Bank, as trustee Filed July 14, 1964, Ser. No. 384,032
16 Claims. (Cl. 101—114)

This application is a continuation-in-part of application Serial No. 313,951, filed October 4, 1963, now abandoned.

This invention relates to electrostatic printing systems of the type wherein electroscopic powder particles are transferred through apertures in an image forming electrode to be transported by an electric field toward an image receiving electrode, and more particularly to improvements therein.

In a Patent No. 3,081,698 by Clyde O. Childress et al., an electrostatic printing system is described wherein a powder image forming electrode comprises a conductive screen which has apertures therethrough arranged in the pattern of the desired image. An electric field is established between this image forming electrode and another electrode which is spaced therefrom by connecting a source of potential to the two electrodes. Electroscopic powder particles having a particle size smaller than that of the screen apertures are pushed through the apertures into the electric field, and, being electrically charged, are carried thereby to the opposite electrode. Thereby the powdered image pattern is deposited upon paper or any other article positioned in the electric field to intercept the powder particles in their path between the image forming electrode and the opposite electrode. Powder particles may be pushed through the screen apertures by using a brush which sweeps powder dropped thereon or carried from a reservoir thereby to the openings in the screens.

It has been found, for reasons that will become apparent in subsequent discussion, that some powder particles, instead of moving uniformly through the image electrode into the electric field to be transferred to the substrate that is to be printed, sometimes tend to clog and stick to the screen necessitating a subsequent cleaning or scavenging operation to clear the image electrodes for subsequent printing operations.

It has further been found, that, using the system previously generally described, the ability to control the density of the printed image is in some cases difficult and complicated, necessitating extensive mechanical devices.

It has been still further found that, with some powders, particularly those that have some degree of conductivity, the image tends to show some forms of scatter on substrates that are moderately conductive; that is outside of the clearly defined image areas that are laid down by the main bulk of the powder coming through the image defining electrode, there are deposited a small number of powder particles that form a halo around the image, which causes, in some cases, lack of definition and reduction in the quality of the image.

An object of this invention is to provide an improved electrostatic printing arrangement.

Another object of this invention is to provide an arrangement for preventing the clogging of the screen in an electrostatic printing system.

Yet another object of this invention is to provide a simple and unique arrangement for electrically controlling the density of the powder image.

Still another object of the present invention is an arrangement for reducing image scatter.

These and other objects of the present invention may be achieved by applying, in addition to the potential difference between the screen and the opposite electrode, a potential difference across a brush, chosen to be slightly conductive, so that a voltage gradient appears across the brush fibers by virtue of their resistivity extending from a high potential at the ferrule of the brush down to a lower potential at the point where the brush fibers contact the screen. The potentials on the various electrodes may be arranged so that the top of the brush fibers has the highest potential, the tips of the brush fibers that contact the screen itself have an intermediate potential and the opposite electode or receiving electrode or the object to be printed on is of a lower potential than the screen or is at an opposite potential. In addition, proper loading of the brush to accommodate the powder demand thereon due to the characteristics of the image being printed, are effectuated by applying different potentials across the brush by segmenting the brush in such a manner that different amplitude potentials can be applied to the portions thereof in accordance with the demand of the image screen across which the brush is rolled. Further, the brush may be loaded from an intermediate roller member which can be used to properly charge the powder particles. Such roller member may be made of isolated segments which have different amplitude potentials applied thereto for the purpose of being differentially loaded with powder whereby the brush which is rolled in contact with the segmented roller assumes differential loads of powder in accordance with the demands of the image screen.

To achieve additional advantageous powder feed, where a bulk powder reservoir is employed, the powder reservoir may also have a potential applied thereto to establish a voltage gradient between reservoir and brush to urge powder particles to the brush.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a diagram illustrating an arrangement for electrostatic printing in accordance with the prior art;

FIGURE 2 schematically illustrates the arrangement shown in FIGURE 1;

Figure 1:
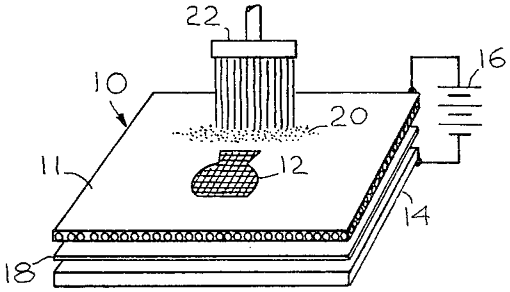

FIGURE 1 illustrates an arrangement for an electrostatic printing system of the type described in Patent 3,081,698 by Clyde O. Childress et al. An image forming electrode 10 may comprise a conductive screen all of which is masked by a suitable masking material 11, except for an aperture region 12 in the form of the desired image to be printed. An electric field is established between the screen 10 and an opposite electrode 14, which is made of a conductive material, by connecting a source of electric potential 16 between the image electrode and the receiving electrode. The receiving electrode 14 may serve as the image receiving medium, or, if desired, another receiving image medium 18, such as a sheet of paper, may be interposed between the image electrode 10 and the receiving electrode 14. Electroscopic powder particles 20 are pushed through the screen apertures in the image region 12 by means such as a brush 22.

Figure 2:
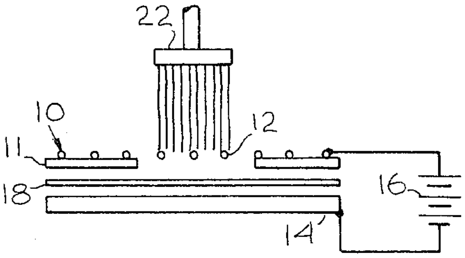

FIGURE 2 is a schematic representation of FIGURE 1, which is shown to simplify the following drawings and the explanations thereof. Identical reference numerals indicate identical structures.

To assist in an understanding of this invention, the following background information is provided.

It has been found that electroscopic powder particles take on a charge by virtue of a number of mechanisms. One of these is triboelectric charging; another is charging by a point-to-point contact with a surface held at a suitable potential. This latter is a type of charging by conduction. These charge assuming mechanisms apply to both highly conductive and essentially non-conductive particles. Even an essentially non-conductive particle will, with repeated contacts with the previously mentioned surface, take on a charge having the polarity of such surface. For this mechanism to be effective, the particle must present continually different areas of its surface to bear on such surface; that is, the charge that the essentially non-conductive particle acquires depends on how long it will remain in contact with such surface and how much of its surface areas contact with surface.

The triboelectric charging mechanism is not yet well understood but it appears to be due to an electron density unbalance so that, when two dissimilar materials are brought into contact, electrons are caused to flow from one material to the other to alleviate this unbalance. Subsequently, when the materials are separated, a net charge equal in magnitude and of opposite polarity is left on each of the materials. The direction of the reaction, that is, the determination as to which material receives which charge, is highly dependent on surface characteristics of the materials and on any contamination material that might be present.

It has been found, for instance, for certain powders, that while a batch of the powder reacting triboelectrically with a given brush and screen material on the whole will preferentially charge to a given sign, because of the presence of miscellaneous contaminations, such as moisture, there will also be a significant number of particles of opposite sign contained in the batch. Therefore, even when the potential of the image electrode with respect to the receiving electrode is chosen to establish an electric field of proper sign to transfer the majority of particles, there are still sufficient numbers of wrongly charged particles which cling, because of electrostatic attraction, to the image electrode. These particles cause clogging of image electrode apertures and necessitate some form of scavenging system. In some cases, this effect is not severe enough to cause complete clogging and subsequent inability to force enough powder of proper sign through to render a proper image, but only causes the annoyance of having powder cling to the substrate side of the image electrode, building up to a point where smudging and smearing of the substrate can occur.

For powders such as these, where charged particles of both polarities can exist in significant numbers, but where there is a majority of particles of one polarity, it has been found, in accordance with this invention, that if in addition to the potential that exists on the image forming electrode, with respect to the image receiving electrode, a potential of the same polarity as the polarity of the potential applied to the image electrode, but of greater magnitude, is connected to the metallic ferrule, of the brush, and the brush fibers are chosen to be slightly conductive (resistance on the order of from $10^8$ to $10^{11}$), then the effect is such that essentially all of the particles that reach the back of the image electrode have similar and proper charges to pass through the image electrode to the receiving electrode, alleviating thereby the problem of clogged image apertures.

Figure 3:
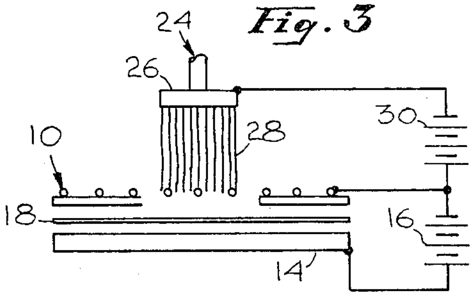
FIGURE 3 is a schematic diagram illustrating an arrangement for an improved electrostatic printing system in accordance with this invention.

FIGURE 3 is a schematic drawing of an embodiment of the invention producing the described results. The conductive screen 10 is the same as before, as is also the electrode 14. A source of potential 16 establishes an electric field between the screen 10 and electrode 14. In accordance with this invention a brush 24, preferably has a conductive ferrule 26, and fibers or hair 28 chosen to be slightly conductive, as indicated above. A potential source 30 is connected between the ferrule and the screen and thus serves to apply a potential difference across the brush fibers.

In the electrostatic printing system shown in FIGURE 1 the only surface placed at a potential with which the powder particles can come in contact is the relatively small surface area of the rear of the image electrode 10. However, the comparatively tremendous surface area of the multifibrous brush 22 is also presented to the powder particles, so that any influence the potential on the image electrode 10 can exert on these particles is small compared with the influence of the brush 22. Any effect that contact with the charged surface of the image electrode can have on the charging of the powder particles, on the whole, will be small in comparison to the effect that contact with the brush fibers can have, because on the whole many more particle contacts are made with the surfaces of the brush fibers than are made with the rear of the image electrode 10.

For this reason, using the system shown in FIGURE 1, the powder particles may take their charge almost entirely by triboelectric reaction with the brush which, as described above, causes many powders to have particles of both polarities, and therefore to have subsequent image aperture clogging.

It has been found that if these powders that charge triboelectrically to both polarities are allowed to contact a surface whose charge corresponds in polarity to the polarity of the majority of powder particles, the charged surface influences the reaction in such a way that essentially all of the powder particles charge to the polarity of the charged surface. It is not yet clear if this phenomenon is due to a charge by contact mechanism, as mentioned earlier, or if the triboelectric reaction, that is, rate and direction of diffusion of electrons is strongly influenced by the presence of the charged surface, or if the phenomenon is a combination of both mechanisms.

In accordance with this invention, a potential 30 is placed on the slightly conductive brush 24 by way of the metallic ferrule of the brush. The sign of this potential with respect to the receiving electrode 14, corresponds to the sign of the majority of the triboelectrically charged particles, and the sign of the potential of the image electrode 10. This causes the brush to effectively become a tremendously large charged surface, whose magnitude of potential is highest at the ferrule, dropping to medium values at the tips where it contacts the image electrode, with respect to the receiving electrode 14. Thus, the powder particles are in contact only with a charged surface of proper sign so that they now become charged to that sign. The effectiveness of this arrangement is further enhanced by the fact that any particle which becomes somehow charged to the wrong polarity, will tend to migrate up the brush fibers 28 away from the image electrode 10 toward the ferrule 26 under the influence of the potential gradient that exists across the brush fibers. This migration gives the particles sufficient time in contact with the charged surface to acquire a charge of the proper sign before being pushed through the image electrode apertures by the mechanical action of the brush, whence, wrongly charged they would not transfer.

Figure 4:
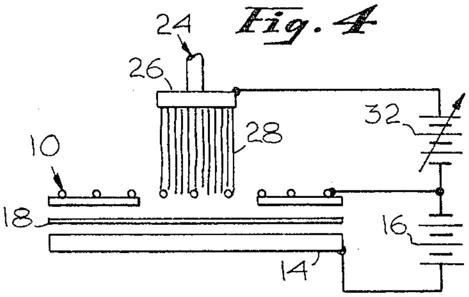
FIGURE 4 is a schematic diagram illustrating the use of this invention for regulating the density of powder deposition.

FIGURE 4 is a schematic diagram of another embodiment of the invention. The structure shown in FIGURE 4 is identical with that shown in FIGURE 3 except that a variable amplitude potential source 32 is connected between the image electrode 10 and the ferrule 26 in a manner so that potentials ranging from very much higher to very much lower than the potential of the screen may be placed thereby on the brush fibers. It now becomes possible by varying the potential 32, to change and control the density of the image placed on the substrate. Furthermore, since the potential difference established across the brush fibers 28 by the potential 32 placed on the brush ferrule is separate and independent from the potential difference 16 that establishes the electric field between the image and receiving electrodes, variations in the potential on the brush ferrule to control print density, do not cause variations in the transfer electric field between image and receiving electrodes, so that image density can be controlled over a full range, from very light images to very heavy, maintaining the same general particle transfer characteristics.

As a result of using the arrangement shown in FIGURE 4, an initial adjustment of the machinery for obtaining a desired image density does not have to be made with precision since any error can be taken up by the use of the above-mentioned controls. If conditions should change during the course of a printing run, resulting in a change of print density, instead of having to stop operations and make complicated adjustments, or in some cases, instead of making said adjustments while the machinery is in operation, in accordance with this invention, such changes can be made almost instantaneously by the simple adjustment of a single control. This control is the one which varies the brush potential.

When in accordance with this invention, the arrangement described above and shown in FIGURE 4 is used for multicolor process printing, where three or four separate images of the primary colors are placed down in register to form a single image in full color, a control of the density of the four separate impressions gives a delicate and simple and unique control over the hue of the final state, for it is the relative densities of the primary color images that determine hue in the final print. As above, adjustments can be made while machinery is in full operation, simply and easily by adjusting the potential on the screen and brush associated with a particular primary color whose density it is desired to change.

A possible explanation of the mechanism responsible for the ability to control the density of the image, as described above, may be that, the potential on the brush fibers, depending on whether that potential is above or below the potential on the image electrode, causes respectively, either an increase or a decrease in the density of particles of proper sign so as to transfer from image electrode to receiving electrode. This increase or decrease, respectively, in density of properly charged particles varies approximately linearly with increasing or decreasing potential. As the density of properly charged particles increases or decreases, the density of the image increases or decreases in an easily and directly controllable manner.

It has been found that scatter, a light halo of powder particles lying around the main image as described above, can be substantially reduced by use of an electrostatic printing system in accordance with this invention. It is believed that scatter is caused primarily by powder particles, that, having arrived at the substrate 18, or the image receiving electrode 14, when no substrate is used, exchange charge with the substrate or receiving electrode and receive thereupon, the charge opposite to the one held when they were transferred. Since these powder particles are still being acted upon by the electric field, they transfer back to the image electrode 10, where the process is repeated. The particle may make many such repeated trips between electrodes 10 and 16 in the course of one image print. During these multiple trips the particle is subjected to many small miscellaneous forces, which would if effective over the distance of just one such trip, be negligible, but when effective over a multiplicity of trips, causes an appreciable displacement of the particle from the image areas. The net effect of this phenomenon, happening to a significant percentage of the total number of transferred particles, is to produce a halo around the image, commonly termed, image scatter.

It is thought that the mechanism by which the embodiment of this invention which is shown in FIGURE 3, alleviates much of the scatter problem is as follows: a scatter particle, returning from the substrate, or the receiving electrode, when no substrate is employed, has a charge opposite to that of the image receiving electrode and the electrified brush so that before it can again return to the substrate or receiving electrode, it must, as described above, attach itself to the image electrode, for a sufficient time to acquire the charge of that electrode.

However, in the arrangement as shown in FIGURE 3, for example, the particle, when it arrives back at the image receiving electrode 10 is influenced by the potential that appears on the brush fibers 28 and since this potential is highest at the metallic ferrule of the brush and has a polarity so as to attract the particle returning from the receiving electrode or substrate, the particle seeking the highest potential opposite in sign to itself, instead of remaining at the image electrode where it would acquire the charge of that electrode and again return to the substrate, or receiving electrode, passes up through the image openings of the image electrode, and migrates up the brush fibers under the influence of the potential gradients existing thereupon. There the particle can regain a charge of the proper sign. It then migrates back down the brush fibers, passes through the image areas and becomes part of the image. The arrangement as shown in FIGURE 3 thus prevents scatter by insuring that essentially all of the charged particles that transfer from image electrode to receiving electrode or substrate, come through the image defining areas from the back side of the image electrode rather than as when scatter occurs, having some particles transfer from the substrate side of the image electrode whereby they are not confined to the image areas.

Figure 5:
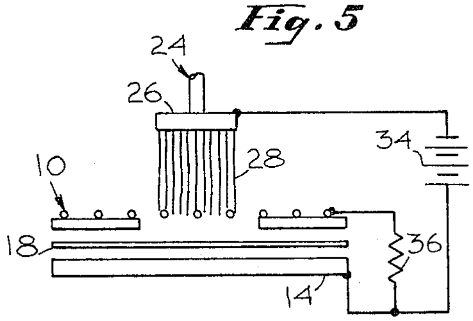
FIGURE 5 is a schematic diagram illustrating another arrangement for an electrostatic printing system in accordance with this invention.

FIGURE 5 shows a schematic diagram of an arrangement for an electrostatic printing system that is, in many ways, equivalent to the electrostatic printing system as described above and illustrated schematically in FIGURE 3. As will become evident in subsequent discussion, however, this system provides some useful and novel advantages that the system shown in FIGURE 2 does not provide.

A source of potential 34 is connected between the brush ferrule 26 and the receiving electrode 14, creating thereby a potential difference between the two. The brush fibers 28 contact the conductive image electrode 10 which is in turn, connected to the receiving electrode 14 through a high value resistor 36. A current is thereby caused to flow through the circuit composed of the abovementioned elements. The magnitude of this current will be directly proportional to the magnitude of the source of potential 34 and inversely proportional to the sum of the values of resistance of the brush fibers 28 and the resistor 36. The current flowing through these resistive elements will cause a voltage gradient to appear across the brush fibers, similar to the voltage gradient across the brush fibers achieved in the system as shown in FIGURE 3 with separate sources of potential. A voltage will also appear across the resistance 36 thereby establishing an electric field between the image electrode and the receiving electrode, identical to the electric field established between the same electrodes by use of a separate source of potential. For a given magnitude sources of potential, the value of the voltage gradient across the brush fibers and the value of the electric field between the image electrode and receiving electrode, will depend on the relative values of resistance of a given bundle of brush fibers, chosen to be greater than $10^8$ ohms is controllable over a wide range of values by merely lengthening or shortening the brush fibers, which gives respectively, greater and lesser resistance. The two elements of resistance are thereby, both independently controllable and therefore the combination of these two elements can be chosen to give the desired voltage gradient across the brush fibers, and the desired electric field between the image electrode and receiving electrode in much the same way as is done by using the separate sources of potential, as shown in FIGURE 3.

If, in the normal operation of an electrostatic printing system, somehow, for various unavoidable reasons, an electric arc is initiated between the image electrode and receiving electrode, the energy contained in that arc will be dissipated in a very small area on the image electrode, and if the energy contained in the arc is above a certain level, this can result in irreversible image electrode damage.

Using the electrostatic printing system as shown schematically in FIGURE 3, the energy available to an arc is that energy stored in the output capacitance of the source of potential, plus the energy stored in the capacitance of the image electrode, receiving electrode system. The energy stored in the source of potential can be quite large, so that an arc initiated in the system shown schematically in FIGURE 1 can contain enough energy to cause damage to the image electrode. However, in the system shown schematically in FIGURE 5, there is the high resistance of the brush fibers between the image electrode and the high energy source of potential, and this high resistance essentially isolates the image electrode from the high energy source of potential for any short duration high energy bursts such as arcs. The only energy available to an arc in the system shown schematically in FIGURE 5 is that energy contained in the capacitance of the image electrode receiving electrode system, the capacity of which is usually quite small, thereby drastically limiting the energy available to arcs, usually to levels well below that required for image electrode damage.

There are applications however, where even using the electrostatic printing system arrangement shown schematically in FIGURE 5 the stored energy available for an arc discharge approaches and in some cases exceeds the critical level above which there may be image electrode damage. This becomes true particularly when the electrostatic printing system is used to print over very large areas, and the image electrode and receiving electrode must therefore be large in area and, as a consequence, if made in the usual way using a metallic image electrode, have appreciable capacity for the storage of energy.

Figure 6:
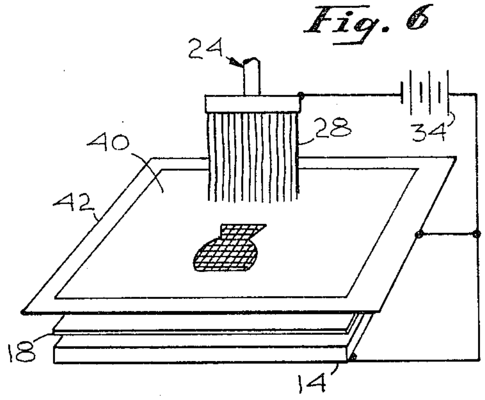
FIGURE 6 is a schematic diagram illustrating an electrostatic printing system with a screen having limited conductivity.

Referring now to FIGURE 6, which illustrates another embodiment of this invention, instead of using a metallic image electrode and completing the electric circuit by connecting said metallic image electrode through a lumped element of resistance, provision is made to distribute this resistance uniformly throughout the image electrode. This is done by constructing the image electrode 40 of a suitable, relatively high resistivity material, such as nylon, treated in such a way as to have limited conductivity. The entire periphery of this image electrode is connected together as by being supported or surrounded by a conductive frame 42, which is connected to the receiving electrode. This completes the electric circuit in the same manner as does using the lumped resistance 36, as described in schematic form in FIGURE 5, but now only those areas immediately in contact with the brush fibers will have a significant potential, the potential dropping to very low values outside of those areas of brush contact, because of the highly resistive nature of the image electrode. Therefore, the effective area available for the storage of electrical energy is reduced to essentially that area being contacted by the brush fibers 28, because energy storage is only significant in regions where the potential is significant.

In this unique manner, then, the area available for electrical energy storage is made so small that there is no danger that the electrical energy available for an arc discharge will be sufficient to cause image electrode damage. Furthermore, since the potential on the image electrode drops to low value outside of the areas of brush contact, arc discharges or shorts that would eliminate the electric field between the image electrode 40 and receiving electrode 14, can occur only at the areas where the brush 24 contacts the image electrode so that it is only important that sufficient spacing be maintained at the area of brush contact, relieving somewhat the difficult task of seeing that the spacing between image electrode and receiving electrode is maintained over large areas.

Figure 7:
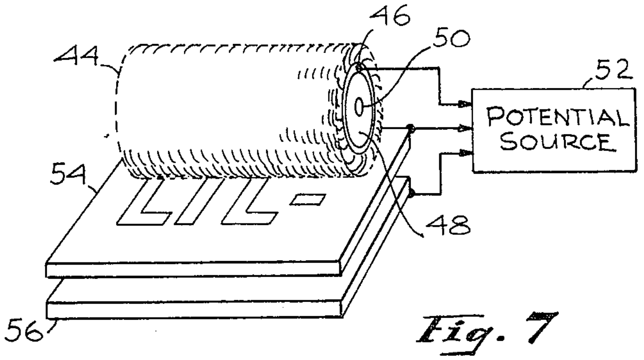
FIGURE 7 illustrates an arrangement for applying potential to fibers on a rotary brush.

While the description and drawings herein show a brush of the "broom type" it should be appreciated that this is exemplary solely, and the invention should not be so limited. The usual automated arrangement for electrostatic printing uses a rotary brush or belt arrangement for feeding powder particles through the image screen. Therefore, other brush forms may be used without departing from the spirit and scope of the invention. For example, FIGURE 7 shows an arrangement in accordance with this invention, for applying a potential to a rotary brush. The brush fibers 44, extend from a ferrule in the shape of a conductive cylinder 46. This is supported by two insulating discs 48 on an axle 50. A potential source 52 is connected to the conductive cylinder by a suitable contacting brush. The potential source is also connected to the image electrode and the image receiving electrode spaced therefrom. Although the brush rotates instead of slides by a means, not shown, to sweep the powder particles through image apertures of the screen, the operation of the system is the same as has been described for the nonrotating type of brush. Fibers carried by belts may similarly be employed.

Figure 8:
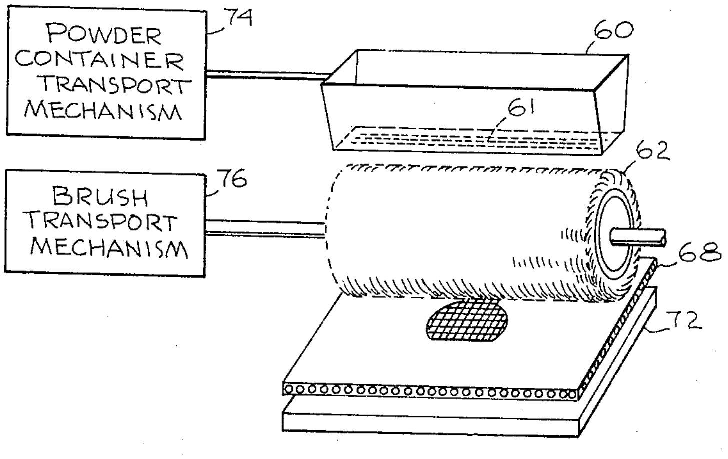
FIGURE 8 is a perspective view of an improved powder feed arrangement in accordance with this invention.
Figure 9:
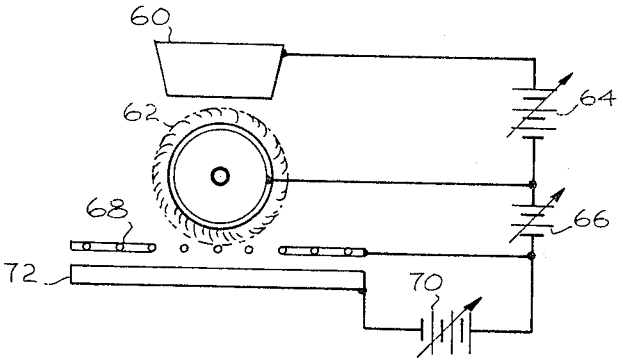
FIGURE 9 is a side view of FIGURE 8.

Additional benefit may be obtained if an arrangement as shown in FIGURES 8 and 9 is used. FIGURE 8 is a view in perspective of an electrostatic printing arrangement, and FIGURE 9 is a side view illustrating the application of bias potential in accordance with this arrangement.

FIGURES 8 and 9 show a reservoir or container 60 of electroscopic powder particles which is supported by any suitable means to always cover a rotary brush 62. The brush may be of the type described in FIGURE 7. The container 60 has a slot 61, represented by dotted lines, which is in the bottom thereof and through which the powder particles are urged to fall on the brush 62. The means for urging the powder particles through the slot is not shown but may be any suitable mechanical actuator for the purpose, such as a lead screw or a paddle wheel. Also, the bottom of the container may also be a screen mesh if desired.

In any event, the container, and more specifically, its bottom, are made of conductive material and as shown in FIGURE 9, a variable source of potential 64 is connected between container 60 and brush 62 to establish a voltage gradient therebetween. This applies a force to the powder particles which tends to carry them to the brush. By varying the potential applied between brush and reservoir, the speed of powder travel between reservoir and brush, and thus the powder feed, is varied. Thereby, in accordance with this invention, an additional powder feed control mechanism is provided.

A variable potential source 66 is connected between the brush 62 and the image screen. Also, a variable potential source 70 is connected between image screen and backing electrode 72. The electrostatic printing system shown in FIGURES 8 and 9 thus provides a continuous potential gradient between powder reservoir and brush, between brush and image screen, and between image screen and backing electrode. Thereby, the powder particles have the forces of an electric field continuously applied to them to urge them from powder reservoir to brush through screen toward backing electrode.

The respective powder reservoir and brush may be maintained in superposed relationship, where it is required that the rotary brush move over the screen, by having a powder container transport mechanism 74 and a brush transport mechanism 76, both of which operate to carry the respective container and brush together reciprocally. These transport mechanisms may be chain driven or motor driven carriages, or any other arrangements which are well known for carrying the container and brush reciprocally.

Of course, where it is not required, that the brush move laterally, but only rotate, or where it is only desired to periodically charge the brush with powder from the reservoir, it is not necessary to move the container laterally.

In the embodiment of the invention which was built, potentials of 8 kv. and 4 kv. were respectively maintained on the container and on the image electrode. The receiving electrode was held at ground potentials. It was found that when the brush potential was held at 4 kv., excess image density was obtained with some image electrode clogging. Decreased image density was obtained as the brush potential was lowered toward ground potential with proportionate increased image electrode aperture clogging. Optimum performance was obtained, with respect to image density and lack of image electrode clogging, when the brush potential was 6 kv.

Figure 10:
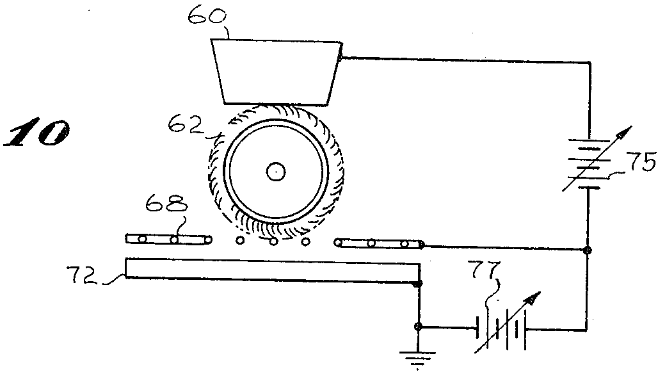
FIGURE 10 illustrates another variation of an improved powder feed in accordance with this invention.

FIGURE 10 shows an arrangement for applying a bias to a powder container 60 and to a brush 62 which eliminates the need for connection to the brush. Here the brush hairs are allowed to contact the bottom of the container, thereby a voltage gradient is established between container, brush and screen by reason of the fact that the brush fibers have a resistance and serve to connect the container 60 and screen 68, both of which are connected across a potential source 75. The potential source 77 is connected between screen and backing plate to establish an electric field therebetween. The behaviour of the powder particles in this system is as described previously.

Any of the brush and screen potential applying arrangements described in connection with FIGURES 2 and 6 may be employed together with the application of a suitable potential to a powder reservoir as shown in FIGURES 8, 9 and 10 to obtain an improved controlled powder feed as well as a reduction in screen clogging.

While FIGURES 8, 9 and 10 show the powder container 60 as being connected to a source of potential for establishing an electric field or potential gradient between it and the brush for urging and guiding powder particles of the proper polarity to the brush, it should be appreciated that the container is being used here as an electrode in setting up the guiding field potential. If only the base of the container opposite the brush were used for this purpose, or some other means was used, such as a properly biased screen on which powder was dumped and then fed through the screen onto the brush, essentially the same operation would occur. Thus the use of the term, container, or reservoir, should not be construed as a limitation on the inventive concept herein, wherein for obtaining an improved operation a biasing potential is applied to the powder containing apparatus from which powder is applied to the brush, where such apparatus is employed while the brush is applying the powder to the image screen.

The polarities of the potentials to the various structures applied from the operating potential sources shown in the drawings are exemplary only and are not to be construed as a limitation on the invention. These polarities vary in accordance with the polarity of the charge on a particular type of electroscopic powder being used. Furthermore, although multiple sources of operating potential are shown operated in tandem, those skilled in the art will without difficulty know how to substitute instead, a single, multiple tapped source of potential instead.

Figure 11:
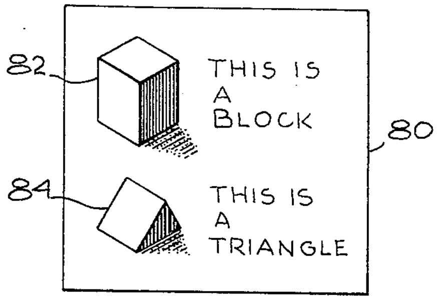
FIGURE 11 represents an image screen which presents differing powder demands on different portions of a powder feed brush.

Attention is directed now to FIGURE 11 which is a drawing representing a screen with different powder demand requirements at different portions thereof which must be met, in order to properly print the image figures of the screen. The heavy shaded portions of the block 82 and the triangle 84 on the screen 80 require a larger amount of powder to be transferred through the screen than is required on the side of the screen at which the lettering is found. If a brush is loaded with enough powder to take care of the dense shading portions of the images on the left side of the screen, then it is carrying more than enough powder required for the images on the right side of the screen 80. Similarly, if a brush is loaded with powder to take care of the right side of the screen, then the dense regions of the images on the left side of the screen will not print out sufficiently well. The techniques described hereinabove consisting of the use of an applied potential on the conductive core or ferrule of a brush to control the pick-up and release of powder may be employed to solve these types of uneven powder demand problems.

Figure 12:
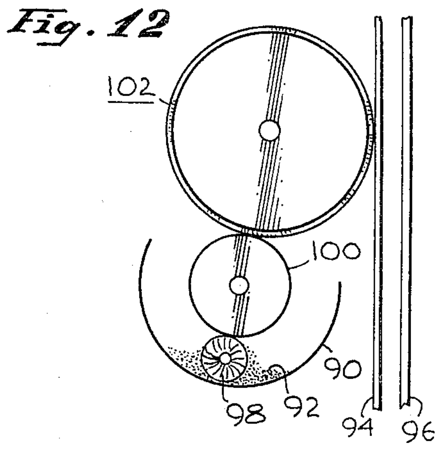
FIGURE 12 is a side view of FIGURES 13, 15 and 16 shown to assist in an understanding of the arrangement of the electrified brush system.

Reference is now made to FIGURE 12 which schematically shows an arrangement for loading a brush in a manner to handle a situation requiring differential powder feeding, such as is shown in FIGURE 11. The view in FIGURE 12 is an end view of the components which are employed. These comprise a powder reservoir 90 which may be conductive or which has a conductive inner liner. Within the reservoir are the pigment powder particles 92, which it is desired to transfer through a screen 94, having openings in a pattern forming an image, onto a substrate 96. Within the reservoir, there is rotatably supported a powder agitator brush 98. This brush usually comprises spirally wound pig bristles along a central core.

The agitator brush 98 is in contact with the surface of a conductive surface transfer roller 100. This rotatably supported conductive roller contacts the surface of a brush 102, which may comprise a rotatably supported roller over which there is a mohair sleeve.

Figure 13:
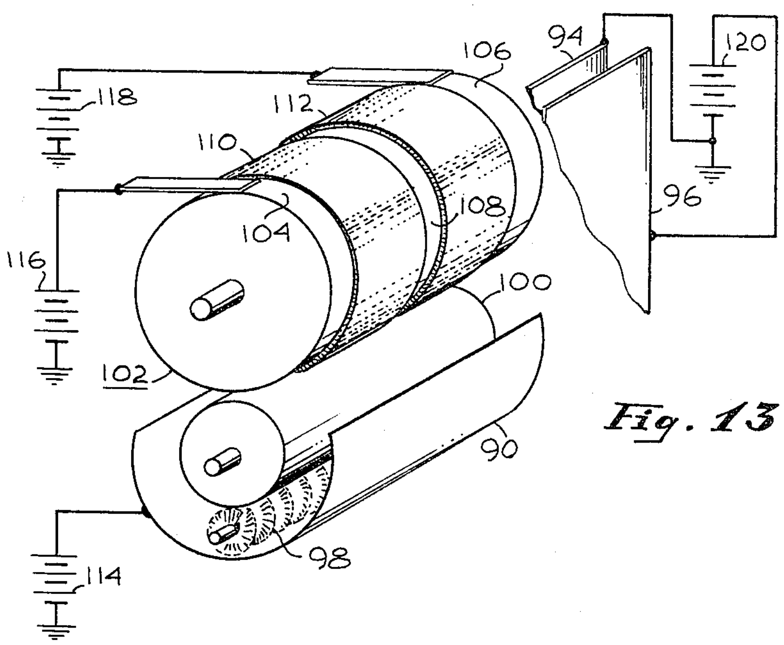
FIGURE 13 is an arrangement for applying differing potentials to a brush for supplying different powder demands occasioned by a screen of the type shown in FIGURE 11.

FIGURE 13 is a view in perspective of the powder demand loading system for the brush. It contains the components shown in FIGURE 12, but in order to more clearly show the brush loading system, the screen is shown in fragmentary fashion. It is assumed that the powder demand on the brush 102 is greater on one side of the screen which is passed by the brush or over which the brush is rotated than the other side of the screen. The screen shown in FIGURE 11 fits this description. Accordingly, the brush 102 has a surface consisting of two conductive regions respectively 104, 106, separated by an insulating region 108. Two mohair sleeves respectively 110, 112 are fitted over the conductive regions. The reservoir 90 is connected to a source of potential. The conductive roller is left floating. The heavy demand side and the light demand sides of the brush are respectively connected to different amplitude source of potential respectively 116 and 118, and the screen 94 and opposing electrode 98 are properly connected to a source of transfer potential 120.

It was found that when a potential of the same sign as the dominant charge of the powder was applied to the print roller, powder was released rapidly. When lesser potential of the same sign or of an opposite potential was applied to the print roller 102, then powder was released reluctantly. Using these phenomenon, by applying a potential of the same sign as the dominant charge of the powder, to the side of the brush upon which there is a large powder demand, and applying a potential of opposite sign or a lesser potential to the side of the brush upon which there is not too much of a powder demand, the brush 102 was able to print evenly and consistently with a screen of the type shown in FIGURE 11. To aid in the transfer of the powder from the powder reservoir to the distribution roller 100, and subsequently to the primary roller, a potential of the same sign as that of the screen 94 and the dominant charge of the powder was applied to the conductive inner lining of the powder reservoir. The modulation of this potential effectively controls the overall amount of the powder transferred to the brush.

By way of example, and not to be construed as a limitation on the invention, some typical voltages used were: reservoir electrodes −4 kilovolts; transfer rollers floating. The low demand side of the brush had a voltage, on the order of −1,000 volts, applied thereto while the high demand side of the brush had a voltage on the order of +100 volts applied thereto. The image screen was connected to ground and the receiving electrode was connected to a voltage on the order of +2 kilovolts.

Figure 14:
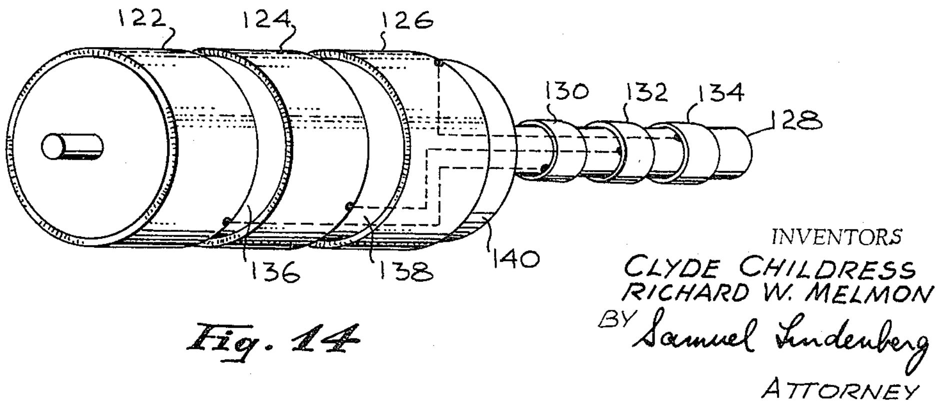
FIGURE 14 illustrates another arrangement for supplying differing potentials to a brush for responding to differential powder demands in an electrostatic printing system.

It should be appreciated that the showing herein of the brush as being divided into two sections for compensating for the uneven demand of a screen, is merely illustrative. Those skilled in the art will appreciate that the brush may be split into a plurality of segments which are isolated from each other. Such segments may be distributed either in an axial direction, as shown, or may be distributed circumferentially over the periphery of the brush cylinder. Each brush segment may be connected to a separate isolated commutator ring, and a plurality of these rings may be mounted on one side of the brush. Alternatively, separate rings may be supported on an axial extension of the axis of the brush. These commutator rings are then connected to different potential sources required by any means, such as conductive brushes. Such an arrangement is shown in FIGURE 14. The brush by way of example has three conductive segments respectively 122, 124, and 126. On a shaft extension 128 of the brush, there is mounted three commutator rings respectively 130, 132, 134. Connection by three separate lines respectively 136, 138, and 140 is made to each one of the commutator rings from the brush segments. Connection of the respective brush segments can then be made by the usual electrical brush contacts, not shown, to the different power supplies or to a single tapped power supply as desired.

Figures 15, 16, 17:
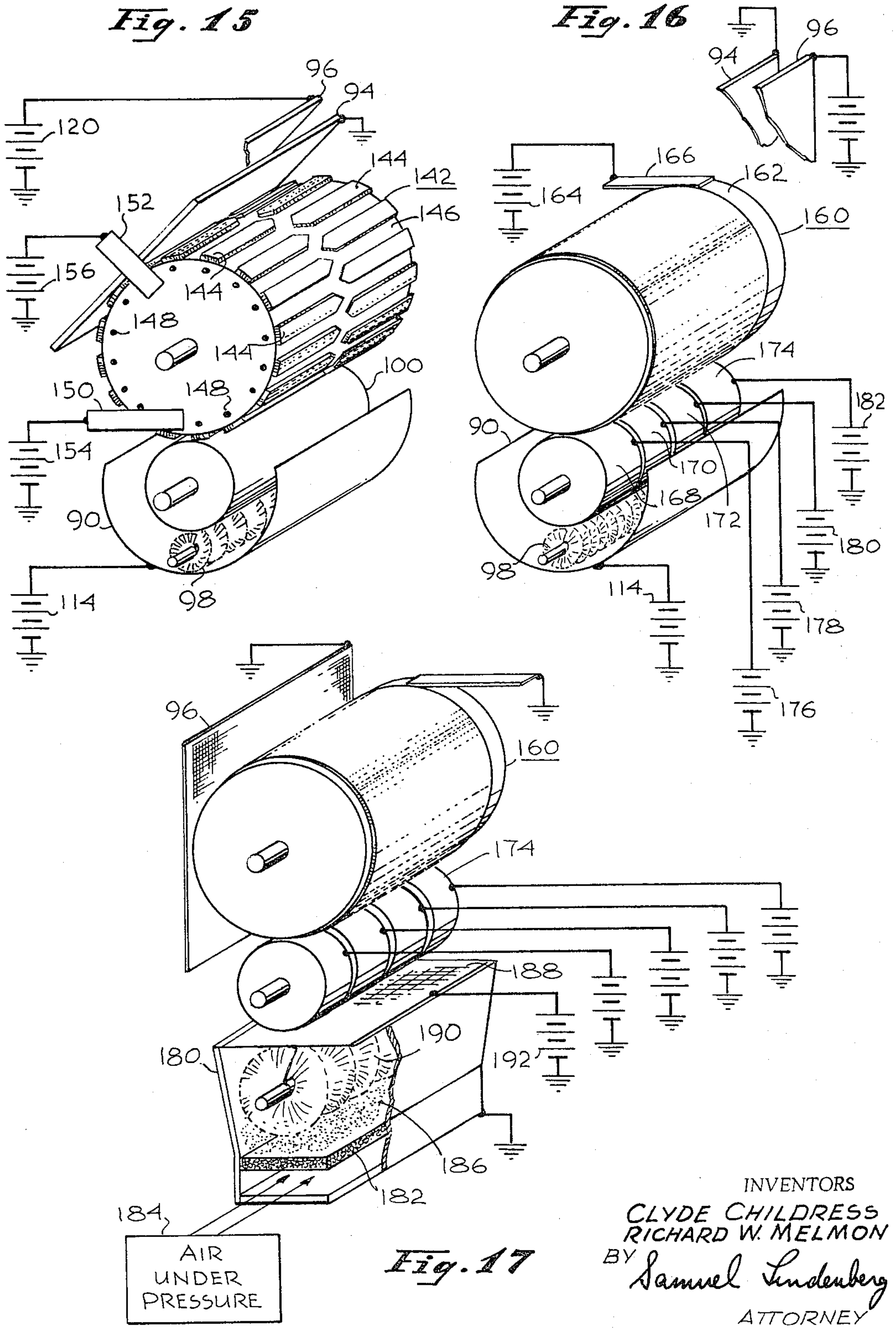
FIGURE 15 shows another embodiment of the invention for differentially electrifying a brush for responding to different powder demands.
FIGURE 16 shows still another embodiment of the invention for differentially electrifying a brush for responding to different powder demands.
FIGURE 17 shows an improvement in a feeding arrangement to the brush.

FIGURE 15 shows still another arrangement for applying bias to achieve differential powder demand supply. In this arrangement, means are provided for isolating the brush segments so that one potential can be applied to a given segment at the point where the brush picks up powder from the load roller, and a different potential can be applied to the brush at the point where the brush releases powder to the image screen. In FIGURE 15, similar functioning apparatus to that shown in FIGURE 13 is given the same reference numeral. The brush 142 comprises axially extending brush segments 144, each of which is mounted on a roller with an insulating surface 146. The back of each brush segment is attached to a conductive ferrule (not shown), each of which is brought out by means of a separate lead to a contact terminal 148. As shown in the isometric drawing, the brush segments 140 extend axially only part way. Other isolated brush segments 144 extend for the remainder of the distance to the opposite end of the brush and are insulated electrically from all of the other segments. These remaining segments also connect by separate wires to separate contacts 148. The respective brushes 150, 152 serve to connect two different potential sources respectively 154, 156, to the moving contacts 148 on the rotating brush. These respective brush contacts apply a first potential to the brush segments when they are being loaded with powder from the roller 100, and a second potential to the brush segments when they are discharging their powder through the screen apertures.

As before, it was found that brush loading can almost be totally inhibited by the application of a potential to the brush segments of the same sign as that of the dominant powder charge and of voltage amplitude approaching that applied to the reservoir electrode. Loading is very rapid using a lesser potential of the same sign as the reservoir electrodes or using a potential of the opposite sign. It was further found that effective print density control can be exercised by applying the brush potential only at the "powder load" position. However, this control is not as complete and displays more lag in reaction than when the controlling potential is also applied at the print position. Some typical voltages which are employed in the configuration shown are, for the reservoir electrode −4 kilovolts. The transfer roller is left floating. The brush had a +2,000 volt potential applied for insuring heavy loading and a −2,000 voltage potential applied for obtaining light loading. For heavy release at the print position, the brush had applied −2,000 volts. For a minimum powder release at the printing position, the brush had +2,000 volts applied thereto. The screen is at ground and the receiving electrode was connected to +2 kilovolts.

FIGURE 16 illustrates an alternative arrangement for biasing the brush with differential potential whereby differential powder feed demands may be met. Similar functioning structures of those shown in FIGURE 13 are given the same reference numerals. In the embodiment of the invention shown in FIGURE 16, the brush 160 comprises a continuous fiber such as mohair, which is fitted over a roller having a conductive periphery. An edge 162 of the roller serves as a commutator ring to which a potential is applied from a source 164 through a brush 166.

In this embodiment of the invention, the transfer roller is divided into four conductive segments respectively 168, 170, 172, and 174. Each one of these segments is connected to a separate source of potential respectively 176, 178, 180, 182.

This arrangement also shows excellent control response in the loading and unloading of the powder to and from the brush. This arrangement has the virtue that is very simple to construct. Some typical voltages which are employed with this arrangement are, for the reservoir electrode (−) 3 kilovolts. The isolated segments of the transfer roller may be varied independently from ground potential, for heavy powder transfer to the primary brush, to (−) 3 kilovolts where powder transfer is almost totally inhibited. The primary brush and the image screen may be held at ground potential. The receiving electrode connected to +2 kilovolts.

The feed of powder in all the previously described arrangements was assisted by the spirally wound fiber brush rotating directly in a powder mass between the reservoir electrode surface and the feed roller. FIGURE 17 shows another arrangement for loading powder onto the conductive transfer roller which improves the uniformity of the print which is obtained by the system. Apparatus functioning similarly to that shown in FIGURE 16 has the same reference numerals applied thereto. The improved feeding arrangement comprises a chamber 180, a portion of the walls of which are shown broken away in order to show what is contained therein. The space inside the chamber is divided into two parts by a porous member 182, such as a sintered bronze porous plate being supported slightly spaced above the bottom of the chamber 180. Air from a source of air under pressure 184 is applied to the space between the bottom and the porous plate 182. Powder 186 which rests on the porous plate is driven by the air coming through the porous plate to form a powder cloud in the portion of the chamber between the porous plate and the top. At the top of the chamber there may be placed a coarse metal screen 188, on the order of a 20 mesh screen. A brush 190 similar to the ones shown and described in the previous embodiments of the invention, is rotatably supported within the chamber so that its fibers brush against the screen 188. The roller 174 is rotatably supported a small distance, on the order of ⅛ of an inch, above the screen. The screen is connected to a source of potential 192.

In operation the system behaves essentially like previously described systems. The potential used on the roller for any segment of the roller effectively governs the amount of powder to be transferred across the field established between the screen 188 and the roller, which was then transferred to the brush. Some typical voltages used with the arrangement shown are as follows: the porous plate as well as the chamber walls are at ground potential. So is the reservoir brush. The feed screen 188 had a potential on the order of −2 kilovolts applied thereto. The voltage potentials on the conductive roller segments were varied from ground potential to secure maximum loading to −2 kilovolts for minimum loading. Both the primary brush 160 and the screen 94 were at ground potential while the receiving electrodes were placed at +2 kilovolts potential. As pointed out, the chief advantage obtained with this type of powder feed is the gain in uniformity in the powder transfer and of the prints resulting therefrom.

There has accordingly been shown herein a novel, useful and unique arrangement for an electrostatic printing system.

We claim:

1. In an electrostatic printing system of the type wherein printing is done using electroscopic powder particles, the improvement comprising an image forming electrode, said image forming electrode being made of a screen having a plurality of apertures therethrough arranged to form the pattern of the image desired to be printed, a conductive opposite electrode spaced from said image forming electrode, a first source of potential connected between said image forming electrode and said opposite electrode for establishing an electric field therebetween, brush means for brushing electroscopic powder particles through the apertures in said screen, said brush means having fibers for contacting the screen in the region of said apertures, a variable potential source, means connecting said variable potential source between said screen and said brush means for applying potential across said brush fibers, and means for varying said variable potential source for controlling the density of the powder image being printed.

2. In an electrostatic printing system as recited in claim 1 wherein said brush means has a conductive ferrule for holding said brush fibers, and said means connecting said variable potential source between said screen and said brush means connects to said ferrule.

3. An electrostatic printing system comprising an electroscopic powder particle reservoir, a brush having brush fibers, a screen having apertures therein disposed in the pattern of a desired powder image, said brush being disposed between said powder particle reservoir and one side of said screen for receiving powder particles from said reservoir and brushing them through the apertures of said screen, an opposed electrode positioned spaced from the other side of said screen, and means for applying different biasing potentials to each of said reservoir, brush fibers, screen and opposed electrode for applying electrical forces to said powder particles for urging them from said reservoir, along said brush fibers through said screen apertures toward said opposed electrode.

4. An electrostatic printing system as recited in claim 3 wherein said brush is divided into separate brush segments each of which is insulated electrically from the other, and said means for applying biasing potential has a separate connection to each of said brush segments for biasing them individually.

5. An electrostatic printing system as recited in claim 3, wherein said means for applying biasing potentials includes a first source of operating potential connected between said reservoir and said brush, a second source of operating potential connected between said brush and screen, and a third source of operating potential connected between said screen and said opposed electrode.

6. An electrostatic printing system as recited in claim 3, wherein said brush fibers contact said reservoir and said screen, and said means for applying biasing potentials includes a first source of operating potential connected between said reservoir and said screen, and a second source of operating potential connected between said screen and said opposed electrode.

7. In an electrostatic printing system of the type wherein a powder image forming screen has apertures therethrough arranged to define the desired image, and said screen is spaced from an opposite electrode, and electroscopic powder particles are urged by a brush having brush fibers through the apertures of said screen into the region between said screen and said opposite electrodes, the improvement comprising a brush formed of a plurality of separate brush segments each of said brush segments being electrically insulated from the other of said brush segments, means for applying a different potential to each of said separate segments for compensating for different powder demands by said screen, powder reservoir means and means for bringing powder particles from said powder reservoir means to said brush segments.

8. Apparatus as recited in claim 7 wherein said means for bringing powder particles from said powder reservoir means to said brush segments comprises a conductive roller means positioned between said powder reservoir means and said brush, means for transferring powder particles from said powder reservoir means to said conductive roller means, and means for applying a potential to said powder reservoir means for assisting the transfer of powder particles toward said conductive roller means.

9. In an electrostatic printing system as recited in claim 7 wherein said reservoir means includes walls defining a chamber, said chamber being open at one side thereof the opposite side thereof constituting the bottom of said chamber, a porous member supported within said chamber above the bottom thereof, means for applying air under pressure between the bottom of said chamber and said porous member, a screen covering the opening of said chamber, a rotatable brush supported within said chamber with its fibers in contact with said screen, and means for applying a potential to said screen for assisting said electroscopic powder particles therethrough.

10. In a system for printing with electroscopic powder particles wherein a powder image forming screen has apertures therethrough arranged to define the desired image, and said screen is spaced from an opposite electrode, the improvement in means for urging electroscopic powder particles through said powder image forming screen comprising brush means for urging powder particles through the apertures of said screen, said brush means comprising a cylinder having more than one brush segment disposed over the surface thereof, each said brush segment being insulated from the other brush segments, and means for applying individual potentials to each one of said brush segments for loading and unloading powder in accordance with the demands of the image on said image forming screen.

11. In an electrostatic printing system as recited in claim 10 wherein said brush segments comprise separate hollow cylinders of brush fibers, a cylinder over the surface of which said cylinders of brush fibers are disposed and supported, said surface of said cylinder being made of insulating material between said cylinders of brush fibers and being made of conducting material underneath and adjacent each cylinder of brush fiber and means for connecting the conductive portions of said cylinders to separate potential sources for biasing said brush fiber cylinders to separate potentials.

12. In an electrostatic printing system as recited in claim 10 wherein said separate brush segments are disposed over the surface of a cylinder, said brush segments extending axially over said cylinder surface, said cylinder surface being made of insulating material between said brush segments, a plurality of contacts insulatingly disposed around a side of said cylinder, means for connecting each one of said contacts to each one of said brush segments, means for applying a first potential to said contacts when said brush is receiving powder, and means for applying a second potential to said contact when said brush is unloading powder.

13. In an electrostatic printing system of the type wherein a powder image forming screen has apertures therethrough arranged to define the desired image and said screen is spaced from an opposite electrode, means for establishing an electric field between said screen and opposite electrode and brush means for urging electroscopic powder particles through the apertures of said screen into the region between said screen and said opposite electrode, the improvement comprising a brush having brush fibers, means for moving said brush and said screen relative to one another to sweep the surface of said screen with said brush surface whereby powder particles which are on said brush are urged through the apertures of said screen, means for applying a potential across said brush fibers for controlling the transfer of powder particles from said brush through said screen aperture, powder particle reservoir means, and means for transferring powder particles from said reservoir means to said brush comprising a conductive roller supported between said reservoir means and in contact with the surface of said brush, and means for electrically biasing said reservoir means to assist in the transfer of powder particles onto said conductive roller and therefrom onto said brush.

14. In an electrostatic printing system as recited in claim 13 wherein said brush has the form of a cylinder rotatably supported in contact with said roller means, said roller means comprises more than one axially displaced conductive segment, each said conductive segment being electrically insulated from the other, and means for applying different potentials to each one of said conductive segments for differentially loading said brush.

15. In an electrostatic printing system as recited in claim 13 wherein said powder reservoir means includes walls defining a chamber, said chamber being open at one side and having a bottom opposite to said open side, a conductive screen covering said open side, a porous member supported within said conductive screen and the bottom, said porous member dividing said chamber into an upper and lower region, means for applying air under pressure between said porous member and the bottom of said chamber, electroscopic powder within the region of said chamber between said porous member and said conductive screen, a spiral brush within said chamber, means for supporting said spiral brush rotatably with its ends adjacent said conductive screen, and means for applying a potential to said conductive screen to assist transfer of powder particles through said conductive screen to said conductive roller.

16. In an electrostatic printing system of the type wherein a powder image forming screen has apertures therethrough arranged to define the desired image, and said screen is spaced from an opposite electrode, and electroscopic powder particles are urged through the aperture of said screen into the region between said screen and said opposite electrodes, the improvement comprising a cylindrical brush, said brush having a plurality of spaced segments insulatingly supported from one another, means for moving said brush to bring the various spaced segments thereof in contact with the surface of said screen for urging powder particles therethrough, powder reservoir means for providing powder particles for said brush, and means for applying different potentials to said different segments of said brush for controlling the transfer of powder thereto from said powder reservoir means and the unloading of powder therefrom through said screen.

References Cited by the Examiner

UNITED STATES PATENTS

| | | | |
|---|---|---|---|
| 2,817,765 | 12/1957 | Hayford et al. | |
| 2,839,400 | 6/1958 | Yeates. | |
| 2,890,968 | 6/1959 | Giaimo. | |
| 2,892,709 | 6/1959 | Mayer. | |
| 2,956,487 | 10/1960 | Giaimo. | |
| 2,966,429 | 12/1960 | Darrel et al. | |
| 2,987,037 | 6/1961 | Bolton | 118—637 |
| 3,008,826 | 11/1961 | Molt et al. | |
| 3,081,698 | 3/1963 | Childress et al. | 101—129 |
| 3,202,092 | 8/1965 | Childress | 101—114 |
| 3,202,093 | 8/1965 | Childress | 101—114 |

FOREIGN PATENTS

| | | |
|---|---|---|
| 81,920 | 9/1956 | Denmark. |

ROBERT E. PULFREY, *Primary Examiner.*

E. S. BURR, *Assistant Examiner.*